United States Patent
Gong et al.

(10) Patent No.: US 9,509,414 B2
(45) Date of Patent: Nov. 29, 2016

(54) ENCRYPTION AND DECRYPTION METHOD AND DEVICE

(71) Applicant: Huawei Technologies Co., Ltd., Shenzhen (CN)

(72) Inventors: Zhaoming Gong, Shenzhen (CN); Haobo Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 14/606,255

(22) Filed: Jan. 27, 2015

(65) Prior Publication Data
US 2015/0215116 A1    Jul. 30, 2015

(30) Foreign Application Priority Data
Jan. 27, 2014  (CN) .......................... 2014 1 0040437

(51) Int. Cl.
| | |
|---|---|
| *H04K 1/00* | (2006.01) |
| *H04B 10/85* | (2013.01) |
| *H04L 9/06* | (2006.01) |
| *H04L 9/18* | (2006.01) |
| *H04L 9/08* | (2006.01) |
| *H04L 29/06* | (2006.01) |
| *H04L 9/28* | (2006.01) |

(52) U.S. Cl.
CPC ............ *H04B 10/85* (2013.01); *H04L 9/0637* (2013.01); *H04L 9/0822* (2013.01); *H04L 9/18* (2013.01); *H04L 9/28* (2013.01); *H04L 63/0435* (2013.01)

(58) Field of Classification Search
CPC ... H04B 10/85; H04L 9/0637; H04L 9/0822; H04L 9/18; H04L 9/28; H04L 63/0435
See application file for complete search history.

(56) References Cited

U.S. PATENT DOCUMENTS

| | | |
|---|---|---|
| 6,697,490 B1 | 2/2004 | Mizikovsky et al. |
| 2005/0188216 A1 | 8/2005 | Crispin et al. |

(Continued)

FOREIGN PATENT DOCUMENTS

| | | |
|---|---|---|
| CN | 1293503 A | 5/2001 |
| CN | 101800638 A | 8/2010 |
| CN | 102037663 A | 4/2011 |

OTHER PUBLICATIONS

Le, D., "Research on AES encryption compoent base on CRT operation mode," J. Changchun Inst. Tech., vol. 13, No. 4, 2012, 3 pages.

(Continued)

*Primary Examiner* — Krisna Lim
(74) *Attorney, Agent, or Firm* — Conley Rose, P.C.

(57) ABSTRACT

The present invention provides an encryption and decryption method and device. In the method, a first optical transport network (OTN) transport device encrypts, according to an initial vector (IV), a key, and an encryption algorithm that are preset, data received by the first OTN transport device, and sends the IV and the encrypted data to a second OTN transport device; and the second OTN transport device receives a value of a high-order counter in the IV and the encrypted data that are sent by the first OTN transport device, where the encrypted data is data encrypted by using the IV, the preset key, and the encryption algorithm, and decrypts the encrypted data according to the preset key, the IV, and a decryption algorithm corresponding to the encryption algorithm.

12 Claims, 7 Drawing Sheets

---

A first OTN transport device encrypts, according to an IV, a key, and an encryption algorithm that are preconfigured, data received by the first OTN transport device    201

Send a value of a high-order counter in the IV and the encrypted data to a second OTN transport device for decryption; where, the IV includes the value of the high-order counter and a value of a low-order counter, where the low-order counter is a counter predetermined by the first OTN transport device and the second OTN transport device    202

(56) References Cited

U.S. PATENT DOCUMENTS

| | | | |
|---|---|---|---|
| 2008/0170691 A1* | 7/2008 | Chang | H04L 9/12 380/270 |
| 2009/0262937 A1 | 10/2009 | Hirth et al. | |
| 2010/0202612 A1 | 8/2010 | Nema et al. | |
| 2010/0316216 A1* | 12/2010 | Fukushima | H04L 9/12 380/42 |
| 2013/0301827 A1* | 11/2013 | Mueller | H04L 9/28 380/28 |
| 2014/0270163 A1* | 9/2014 | Merchan | H04L 9/0869 380/46 |

OTHER PUBLICATIONS

Foreign Communication From a Counterpart Application, Chinese Application No. 201410040437.8, Chinese Office Action dated Jul. 4, 2016, 7 pages.

* cited by examiner

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | FAS | FAS | FAS | FAS | FAS | FAS | MFAS | SM | | | GCC0 | | RES | RES | JC4 | JC1 |
| 2 | RES | RES | PM&TCM | TCM ACT | TCM6 | | TCM5 | | | TCM4 | | | FTFL | JC5 | JC2 |
| 3 | TCM3 | | | | TCM2 | | | TCM1 | | | PM | | | EXP | JC6 | JC3 |
| 4 | GCC1 | | | | GCC2 | | | APS/PCC | | | RES | RES | RES | RES | RES | RES | PS1 | |

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | Frame synchronization header | | | | | | | OTUk overhead | | | | | | | Mapping and connection specific | |
| 2 | ODUK overhead | | | | | | | | | | | | | | | |
| 3 | | | | | | | | | | | | | | | | |
| 4 | | | | | | | | | | | | | | | | PSI |

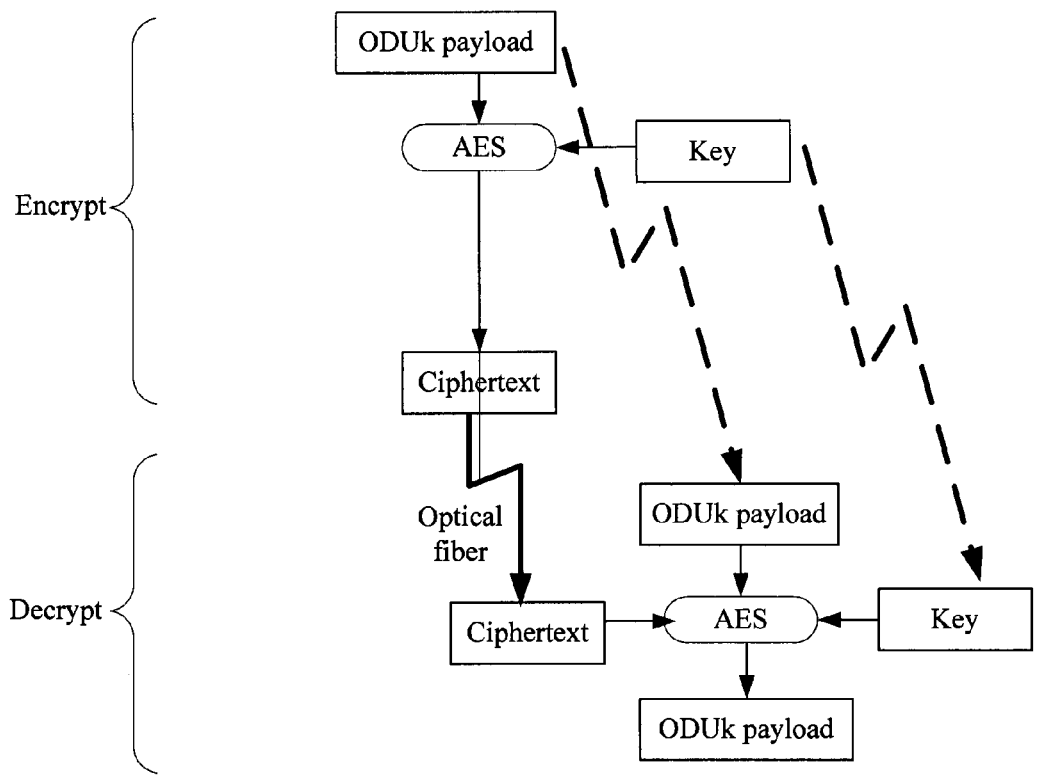

FIG. 6

A second OTN transport device receives a value of a high-order counter in an IV and encrypted data that are sent by a first OTN transport device, where the encrypted data is data encrypted by using the IV, a preconfigured key, and the encryption algorithm — 701

Decrypt the encrypted data according to the preconfigured key, the IV, and a decryption algorithm corresponding to the encryption algorithm — 702

FIG. 7

ENCRYPTION AND DECRYPTION METHOD AND DEVICE

CROSS-REFERENCE TO RELATED APPLICATION

This application claims priority to Chinese Patent Application No. 201410040437.8, filed on Jan. 27, 2014, which is hereby incorporated by reference in its entirety.

TECHNICAL FIELD

The present invention relates to the field of communications, and in particular, to an encryption and decryption method and device.

BACKGROUND

In a conventional system for secure transport of customer data, as shown in FIG. 1, data of a client is encrypted by an encryption device of the client, and then is transported by an optical transport network (OTN) transport device to an OTN transport device of another client through a fiber network, and a decryption device of the another client sends the received encrypted data to the another client after decrypting the received encrypted data. Therefore, for conventional data transmission, different encryption devices need to be configured according to different types of customer services, and costs of constructing a secure transport system are high.

SUMMARY

Embodiments of the present invention provide an encryption and decryption method, which is intended to solve and avoid a problem that different encryption devices need to be configured according to different types of customer services.

According to a first aspect, an encryption method is provided, where the method includes encrypting, by a first OTN transport device according to an initial vector (IV), a key, and an encryption algorithm that are preset, data received by the first OTN transport device; and sending a value of a high-order counter in the IV and the encrypted data to a second OTN transport device for decryption; where the IV includes the value of the high-order counter and a value of a low-order counter, where the low-order counter is a counter predetermined by the first OTN transport device and the second OTN transport device.

With reference to the first aspect, in a first possible implementation manner of the first aspect, the sending a value of a high-order counter in the IV and the encrypted data to a second OTN transport device for decryption includes sending the value of the high-order counter in the IV to the second OTN transport device by using a preset overhead in an optical channel data unit (ODU) frame or an optical channel transport unit (OTU) frame; and sending the encrypted data to the second OTN transport device by using a payload in the ODU frame or the OTU frame.

With reference to the first possible implementation manner of the first aspect, in a second possible implementation manner of the first aspect, the sending the value of the high-order counter in the IV to the second OTN transport device by using a preset overhead in an ODU frame or an OTU frame includes sending the value of the high-order counter in the IV to the second OTN transport device by using the preset overhead in the ODU frame or the OTU frame.

With reference to the first aspect or the first possible implementation manner of the first aspect or the second possible implementation manner of the first aspect, in a third possible implementation manner of the first aspect, the encrypting, by a first OTN transport device according to an IV, a key, and an encryption algorithm that are preset, data received by the first OTN transport device includes encrypting, by the first OTN transport device according to the IV, the key, and the first algorithm that are preset, the data received by the first OTN transport device; where the encryption algorithm is a first algorithm, or a first algorithm and a second algorithm.

With reference to the third possible implementation manner of the first aspect, in a fourth possible implementation manner of the first aspect, the first algorithm is an advanced encryption standard (AES) algorithm, and the second algorithm is an exclusive OR (XOR) algorithm.

According to a second aspect, a decryption method is provided, where the method includes receiving, by a second OTN transport device, a value of a high-order counter in an IV and encrypted data that are sent by a first OTN transport device, where the encrypted data is data encrypted by using the IV, a preset key, and the encryption algorithm; and decrypting the encrypted data according to the preset key, the IV, and a decryption algorithm corresponding to the encryption algorithm; where the IV includes the value of the high-order counter and a value of a low-order counter, where the low-order counter is a counter predetermined by the first OTN transport device and the second OTN transport device.

With reference to the second aspect, in a first possible implementation manner of the second aspect, the receiving, by a second OTN transport device, a value of a high-order counter in an IV and encrypted data that are sent by a first OTN transport device, where the encrypted data is data encrypted by using the IV, a preset key, and the encryption algorithm includes receiving, by the second OTN transport device, the value of the high-order counter sent by the first OTN transport device by using a preset overhead in an ODU frame or an OTU frame.

With reference to the first possible implementation manner of the second aspect, in a second possible implementation manner of the second aspect, before the decrypting the encrypted data according to the preset key, the IV, and a decryption algorithm corresponding to the encryption algorithm, the method further includes, in a case in which the second OTN transport device detects that the values of the high-order counter are non-consecutive, detecting whether the values of the high-order counter sent by the first OTN transport device are consecutive for multiple times, where the multiple times are at least one time; and if yes, changing, by the second OTN transport device, values of a local high-order counter to the values of the high-order counter sent by the first OTN transport device.

With reference to the second possible implementation manner of the second aspect, in a third possible implementation manner of the second aspect, the method further includes, if the second OTN transport device detects that the values of the high-order counter sent by the first OTN transport device are not consecutive for multiple times, determining that the first OTN transport device is abnormal.

With reference to the second aspect, in a fourth possible implementation manner of the second aspect, before the decrypting the encrypted data according to the preset key, the IV, and a decryption algorithm corresponding to the encryption algorithm, the method further includes receiving, by the second OTN transport device, a request sent by the first OTN transport device; in a case in which the second OTN determines decryption, sending acknowledgement information of the request to the first OTN transport device; receiving a key switching command sent by the first OTN transport device, where the key switching command carries time information of key switching; and acquiring a decryption key according to the time information of the key switching and a preset key generation algorithm.

With reference to the second aspect, in a fifth possible implementation manner of the second aspect, before the decrypting the encrypted data according to the preset key, the IV, and a decryption algorithm corresponding to the encryption algorithm, the method further includes receiving, by the second OTN transport device, a request sent by the first OTN transport device; in a case in which the second OTN determines decryption, sending acknowledgement information of the request to the first OTN transport device; receiving a key switching command sent by the first OTN transport device; and acquiring a decryption key according to the key switching command and the preset key.

With reference to the second aspect or the first possible implementation manner of the second aspect or the second possible implementation manner of the second aspect or the third possible implementation manner of the second aspect or the fourth possible implementation manner of the second aspect or the fifth possible implementation manner of the second aspect, in a sixth possible implementation manner of the second aspect, the decrypting the encrypted data according to the preset key, the IV, and a decryption algorithm corresponding to the encryption algorithm, includes decrypting, by the second OTN transport device according to the IV, the key, and the first algorithm that are preset, the encrypted data sent by the first OTN transport device; where the encryption algorithm is a first algorithm, or a first algorithm and a second algorithm.

With reference to the sixth possible implementation manner of the second aspect, in a seventh possible implementation manner of the second aspect, the first algorithm is an AES algorithm, and the second algorithm is an XOR algorithm.

According to a third aspect, an OTN transport device is provided, where the device includes an encrypting unit configured to encrypt received data according to an IV, a key, and an encryption algorithm that are preset; and a sending unit configured to send a value of a high-order counter in the IV and the encrypted data to a second OTN transport device for decryption; where the IV includes the value of the high-order counter and a value of a low-order counter, where the low-order counter is a counter predetermined by the first OTN transport device and the second OTN transport device.

With reference to the third aspect, in a first possible implementation manner of the third aspect, the sending unit is configured to send the value of the high-order counter in the IV to the second OTN transport device by using a preset overhead in an ODU frame or an OTU frame; and send the encrypted data to the second OTN transport device by using a payload in the ODU frame or the OTU frame.

With reference to the first possible implementation manner of the third aspect, in a second possible implementation manner of the third aspect, the sending, by the sending unit, the value of the high-order counter in the IV to the second OTN transport device by using a preset overhead in an ODU frame or an OTU frame includes sending the value of the high-order counter in the IV to the second OTN transport device by using the preset overhead in the ODU frame or the OTU frame.

With reference to the third aspect or the first possible implementation manner of the third aspect or the second possible implementation manner of the third aspect, in a third possible implementation manner of the third aspect, the encrypting unit is configured to encrypt, according to the IV, the key, and the first algorithm that are preset, the data received by the first OTN transport device; where the encryption algorithm is a first algorithm, or a first algorithm and a second algorithm.

With reference to the third possible implementation manner of the third aspect, in a fourth possible implementation manner of the third aspect, the first algorithm is an AES algorithm, and the second algorithm is an XOR algorithm.

According to a fourth aspect, an OTN transport device is provided, where the device includes a receiving unit configured to receive a value of a high-order counter in an IV and encrypted data that are sent by a first OTN transport device, where the encrypted data is data encrypted by using the IV, a preset key, and the encryption algorithm; and a decrypting unit configured to decrypt the encrypted data according to the preset key, the IV received by the receiving unit, and a decryption algorithm corresponding to the encryption algorithm; where the IV includes the value of the high-order counter and a value of a low-order counter, where the low-order counter is a counter predetermined by the first OTN transport device and the second OTN transport device.

With reference to the fourth aspect, in a first possible implementation of the fourth aspect, the receiving unit is configured to receive the value of the high-order counter sent by the first OTN transport device by using a preset overhead in an ODU frame or an OTU frame.

With reference to the first possible implementation manner of the fourth aspect, in a second possible implementation manner of the fourth aspect, the device further includes a changing unit, where the changing unit is configured to, in a case in which the second OTN transport device detects that the values of the high-order counter are non-consecutive, detect whether the values of the high-order counter sent by the first OTN transport device are consecutive for multiple times, where the multiple times are at least one time; and if yes, change values of a local high-order counter to the values of the high-order counter sent by the first OTN transport device.

With reference to the second possible implementation manner of the fourth aspect, in a third possible implementation manner of the fourth aspect, the device further includes a determining unit, where the determining unit is configured to, if it is detected that the values of the high-order counter sent by the first OTN transport device are not consecutive for multiple times, determine that the first OTN transport device is abnormal.

With reference to the fourth aspect, in a fourth possible implementation manner of the fourth aspect, the device further includes a key switching unit, where the key switching unit is configured to receive a request sent by the first OTN transport device; in a case in which decryption is determined, send acknowledgement information of the request to the first OTN transport device; receive a key switching command sent by the first OTN transport device, where the key switching command carries time information of key switching; and acquire a decryption key according to the time information of the key switching and a preset key generation algorithm.

With reference to the fourth aspect, in a fifth possible implementation manner of the fourth aspect, the device further includes a key switching unit, where the key switching unit is configured to receive a request sent by the first OTN transport device; in a case in which decryption is determined, send acknowledgement information of the request to the first OTN transport device; receive a key switching command sent by the first OTN transport device; and acquire a decryption key according to the key switching command and the preset key.

With reference to the fourth aspect or the first possible implementation manner of the fourth aspect or the second possible implementation manner of the fourth aspect or the third possible implementation manner of the fourth aspect or the fourth possible implementation manner of the fourth aspect or the fifth possible implementation manner of the fourth aspect, in a sixth possible implementation manner of the fourth aspect, the decrypting unit is configured to decrypt, according to the IV, the key, and the first algorithm that are preset, the encrypted data sent by the first OTN transport device; where the encryption algorithm is a first algorithm, or a first algorithm and a second algorithm.

With reference to the sixth possible implementation manner of the fourth aspect, in a seventh possible implementation manner of the fourth aspect, the first algorithm is an AES algorithm, and the second algorithm is an XOR algorithm.

The embodiments of the present invention provide an encryption and decryption method. In the method, a first OTN transport device encrypts, according to an IV, a key, and an encryption algorithm that are preset, data received by the first OTN transport device, and sends the IV and the encrypted data to a second OTN transport device; and the second OTN transport device receives a value of a high-order counter in the IV and the encrypted data that are sent by the first OTN transport device, where the encrypted data is data encrypted by using the IV, the preset key, and the encryption algorithm, and decrypts the encrypted data according to the preset key, the IV, and a decryption algorithm corresponding to the encryption algorithm. Therefore, an encryption and decryption function is added to an OTN transport device, types of services do not need to be distinguished, and a dedicated encryption device is saved, thereby reducing system costs, and bringing a great benefit to an operator.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

FIG. 6 is a flowchart of a decryption method according to an embodiment of the present invention;

FIG. 7 is a schematic diagram of a key switching method at an encryption end and a decryption end according to an embodiment of the present invention;

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
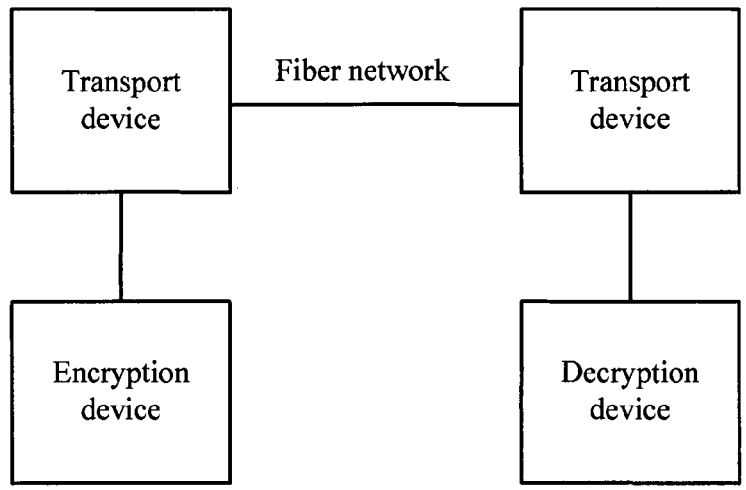
FIG. 1 is a structural diagram of a system for secure transport of customer data in the prior art.
Figure 2:
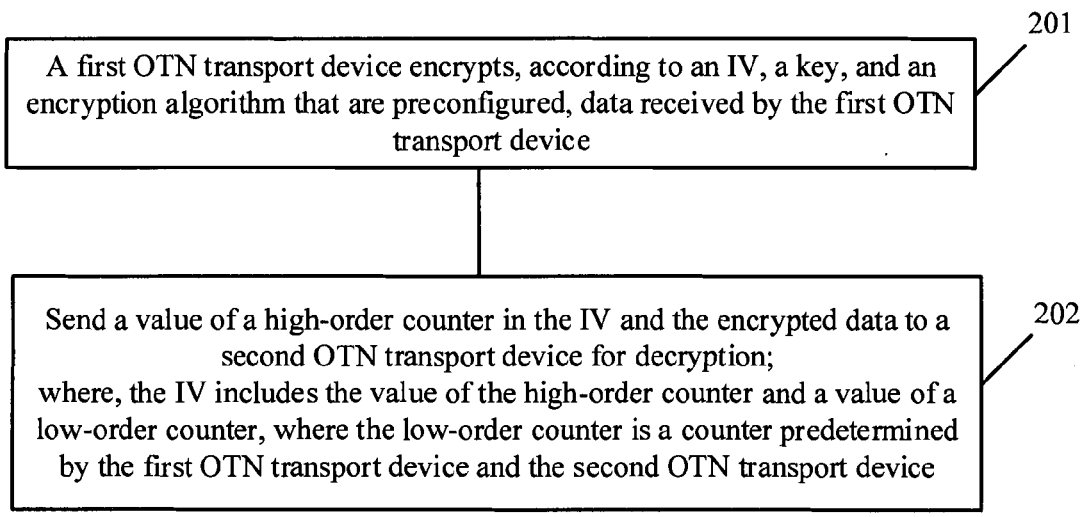
FIG. 2 is a flowchart of an encryption method according to an embodiment of the present invention.

Referring to FIG. 2, FIG. 2 is a flowchart of an encryption method according to an embodiment of the present invention. As shown in FIG. 2, the method includes the following steps.

Step 201: A first OTN transport device encrypts, according to an IV, a key, and an encryption algorithm that are preset, data received by the first OTN transport device.

For an encryption and decryption algorithm of the present invention, reference may be made to multiple structures such as an electronic codebook (ECB), cipher block chaining (CBC), encryption and decryption feedback (Cipher Feedback (CFB)), output feedback (OFB), and a counter (CTR).

Optionally, the encryption algorithm is a first algorithm, or a first algorithm and a second algorithm. The first algorithm is an AES algorithm, and the second algorithm is an XOR algorithm. In the multiple structures such as the ECB, CBC, CFB, and OFB, original data may be encrypted by using the AES algorithm or by using a combination of AES encryption and XOR encryption.

Figure 3:
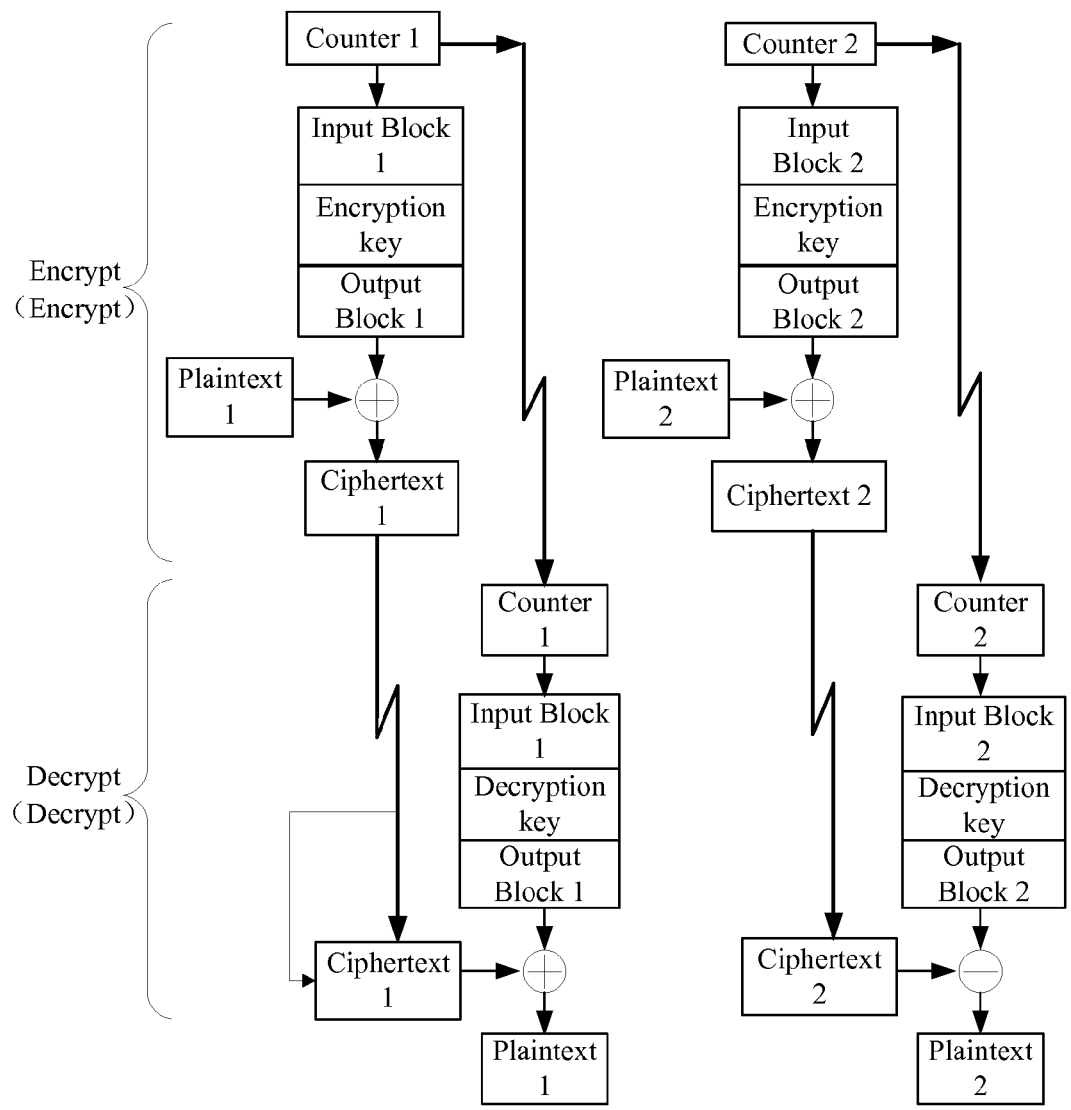
FIG. 3 is a schematic diagram of an encryption and decryption method according to an embodiment of the present invention.

The IV is a counter in a CTR structure. As shown in FIG. 3, FIG. 3 is a schematic structural diagram of a CTR in the prior art. An IV Coutner1 is input, and a plaintext 1 is encrypted by using a combination of AES encryption and XOR encryption to acquire a ciphertext 1; at a decryption end, the IV Counter1 is input, and the ciphertext 1 is decrypted by using a combination of an AES decryption algorithm and an XOR decryption algorithm to acquire the plaintext 1. An IV Coutner2 is input, and a plaintext 2 is encrypted by using a combination of AES encryption and XOR encryption to acquire a ciphertext 2; at the decryption end, the IV Counter2 is input, and the ciphertext 2 is decrypted by using a combination of an AES decryption algorithm and an XOR decryption algorithm to acquire the plaintext 2.

Step 202: Send a value of a high-order counter in the IV and the encrypted data to a second OTN transport device for decryption.

The IV includes the value of the high-order counter and a value of a low-order counter, where the low-order counter is a counter predetermined by the first OTN transport device and the second OTN transport device.

In the CTR structure, the second algorithm is the XOR algorithm, the IV is a counter, and the counter may be classified into a high-order counter and a low-order counter. Transport of the IV between the first OTN transport device and the second OTN transport device may be implemented by using a preset overhead.

In other modes, for example, in the ECB, CBC, CFB, and OFB modes, transport of the IV may still be implemented by using a preset overhead.

The embodiments of the present invention are hereinafter described in detail by using only the CTR structure as an example.

Figure 4:
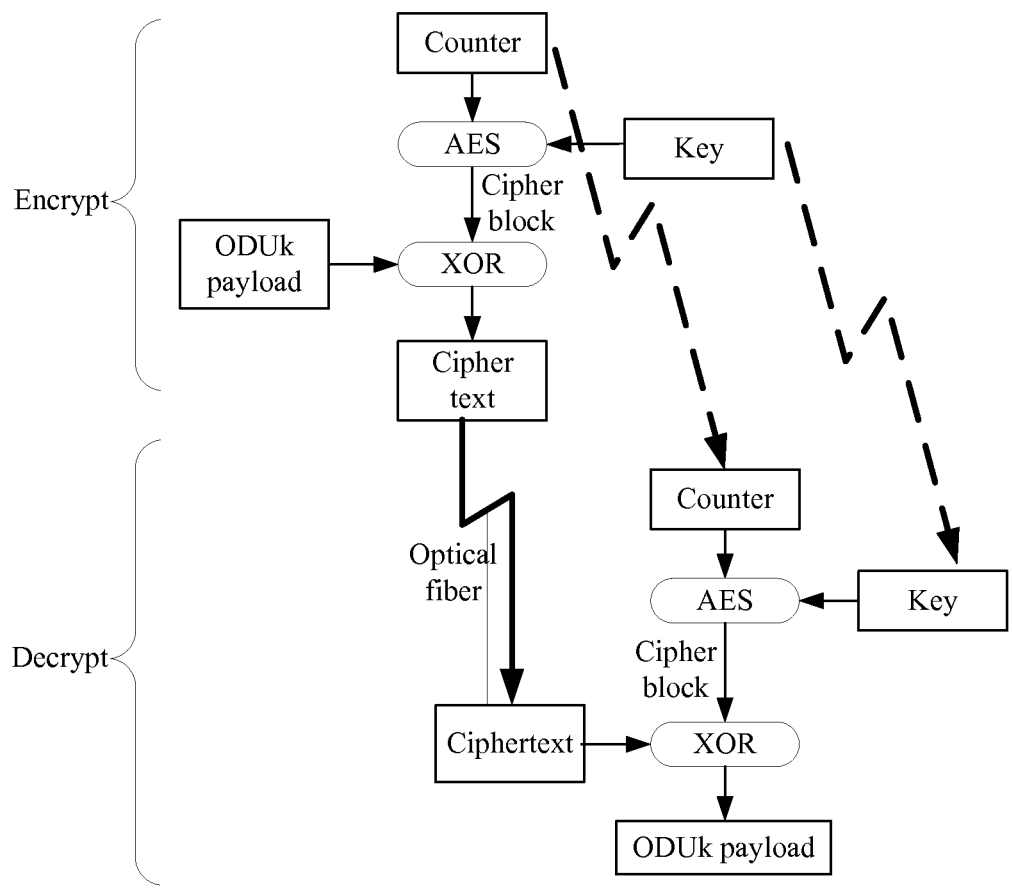
FIG. 4 is a schematic diagram of a method for sending an IV according to an embodiment of the present invention.

Referring to FIG. 4, FIG. 4 is a schematic diagram of an encryption and decryption method according to an embodiment of the present invention. As shown in FIG. 4, an encryption end is a first OTN transport device, and a decryption end is a second OTN transport device. The first OTN transport device calculates, after acquiring an IV and a key, a cipher block by using an AES algorithm. The first OTN transport device acquires data to be encrypted, from an ODUk payload in an ODU frame or an OTUk frame, and encrypts, by using the Cipher block and an XOR algorithm, the data to be encrypted to obtain a ciphertext. The first OTN transport device sends the ciphertext to the second OTN transport device, and the first OTN transport device sends the counter to the second OTN transport device by using an overhead. The second OTN transport device acquires the ciphertext and the Counter, and decrypts the ciphertext by using the Counter, a preset key, the AES algorithm, and the XOR algorithm, and acquires the data to be encrypted from the ODUk payload in the ODU frame or the OTU frame.

Optionally, the sending a value of a high-order counter in the IV and the encrypted data to a second OTN transport device for decryption includes sending the value of the high-order counter in the IV to the second OTN transport device by using a preset overhead in an ODU frame or an OTU frame; and sending the encrypted data to the second OTN transport device by using a payload in the ODU frame or the OTU frame.

The ciphertext is transported in every frame. The IV is located in a position different from that of the ciphertext in the frame, but is transported in some frames.

Figure 5:
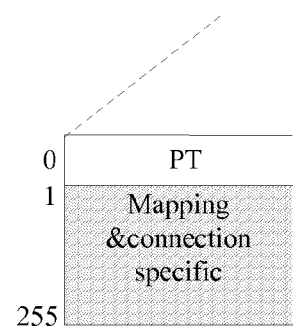
FIG. 5 is a schematic diagram of an encryption and decryption method according to an embodiment of the present invention.

Referring to FIG. 5, FIG. 5 is a schematic diagram of a standard frame structure in the prior art. The Counter may be transported by using an ODUk or OTUk overhead, or the Counter is transported by using a RES field, a PSI reserved overhead, or other overheads. A typical application is using a PSI field. A PSI in an ODUk Overhead area carries the Counter.

Optionally, the sending the value of the high-order counter in the IV to the second OTN transport device by using a preset overhead in an ODU frame or an OTU frame includes sending the value of the high-order counter in the IV to the second OTN transport device by using the preset overhead in the ODU frame or the OTU frame, where the IV includes the value of the high-order counter and a value of a low-order counter, where the low-order counter is a counter predetermined by the first OTN transport device and the second OTN transport device.

According to the CTR structure, a same IV vector needs to be provided when a cipher block is calculated during encryption and decryption. In implementation of an ODUk, with respect to a feature of an OTN system, the IV is obtained by counting ODUk data. The IV consists of 2 counters, which are respectively a high-order counter that counts based on an OTN multiframe and a low-order counter based on any Byte data. In a manner of replicating and splicing the counters or other manners, the higher-order and low-order counters are extended into 128-bit information for use by a AES encryption algorithm.

The value of the high-order counter is transported by using the ODUk or OTUk overhead in the OTN system, for example, the PSI reserved overhead, EXP overhead, and other overheads. However, the value of the low-order counter is obtained by calculation by the encryption end and the decryption end respectively according to determined Byte data, and is not transported by using an overhead. This saves an overhead bandwidth, ensures that an IV value is synchronized rapidly, and because of privacy of the IV, also ensures that a complete IV value cannot be restored from an optical fiber even if the optical fiber is monitored, and thereby ensures that the encrypted data cannot be cracked.

To ensure synchronization of keys of the encryption end and the decryption end, it is necessary to transport a current value of the high-order counter from the encryption end to the decryption end, but the low-order counter only needs to be maintained by the encryption end and decryption end respectively. Like a KEY value, the IV value needs to be updated periodically, or otherwise, the IV value is easily cracked. If the KEY value changes every 2 hours, the IV value changes constantly within 2 hours. In this way, calculated cipher blocks are not repeated. After the 2 hours, the keys are updated, and a new cycle of IV values may be started again. In a typical application, for example, the high-order counter is preset to count based on a multiframe, and the low-order counter is preset to count based on 16 Byte and is cleared by a high-order counting pulse. By using this calculation manner, it may be ensured that IV values are not repeated within N hours (N may be 2.7), that is, for an OTUk, a longest interval, that may be supported, of updating a key is 2.7 hours.

When a device at the encryption end is abnormal, a case in which IV vectors at the two ends are inconsistent may occur, and a synchronization mechanism is required to ensure consistency between the IV vector at the decryption end and the IV vector at the encryption end. A manner is transporting the high-order counter in the IV vector by using an overhead. A preferred overhead is a reserved overhead, where the reserved overhead is an overhead without a clock in the current OTN system. The encryption end transports a currently used high-order counter in the overhead. After receiving a value of the high-order counter, the decryption end compares it with a value of a local high-order counter; if the values are equal, a decryption process is performed normally; if the values are not equal for multiple times, the decryption end enters an out-of-synchronization state. In this case, the decryption end starts to determine whether the value of the high-order counter transported by the encryption end is correct. A determining method includes predetermining a next value of the high-order counter sent by the encryption end; if it is predetermined that the next value is correct, updating the value of the local high-order counter to be the same as that of the encryption end, and thereby obtaining IV values of same composition. For example, it is assumed that values at the decryption end are 0 1 2 3 4 5, but values at the sending end are 0 1 2 3 4 5 9. The decryption end considers that 9 is incorrect, because a value of the local high-order counter calculated locally by the second OTN transport device according to a consecutive counting rule should be 6. The decryption end continues to detect values of the high-order counter sent by the encryption end. If the encryption end continues to send 10 11 12 13 14, the decryption end detects that values of the high-order counter sent by the encryption end satisfy the consecutive counting rule, and the decryption end may automatically skip to 14. Then local count values of the decryption end become 15 16, and so on.

Optionally, the encrypting, by a first OTN transport device according to an IV, a key, and an encryption algorithm that are preset, data received by the first OTN transport device includes encrypting, by the first OTN transport device according to the IV, the key, and the first algorithm that are preset, the data received by the first OTN transport device.

Referring to FIG. 6, FIG. 6 is a schematic diagram of an encryption and decryption method according to an embodiment of the present invention. As shown in FIG. 6, an encryption end is a first OTN transport device, and a decryption end is a second OTN transport device. After acquiring an IV and a key, the first OTN transport device encrypts data by using an AES algorithm, and sends a ciphertext obtained after encryption to the second OTN transport device. In addition, the first OTN transport device sends the IV to the second OTN transport device by using an overhead. The second OTN transport device acquires the ciphertext and the IV, and decrypts the ciphertext by using the IV, preset key, and AES algorithm, and acquires data to be encrypted from an ODUk payload in the ODU frame or the OTU frame.

The embodiment of the present invention provides an encryption and decryption method. In the method, a first OTN transport device encrypts, according to an IV, a key, and an encryption algorithm that are preset, data received by the first OTN transport device, and sends the IV and the encrypted data to a second OTN transport device; and the second OTN transport device receives a value of a high-order counter in the IV and the encrypted data that are sent by the first OTN transport device, where the encrypted data is data encrypted by using the IV, the preset key, and the encryption algorithm, and decrypts the encrypted data according to the preset key, the IV, and a decryption algorithm corresponding to the encryption algorithm. Therefore, an encryption and decryption function is added to an OTN transport device, types of services do not need to be distinguished, and a dedicated encryption device is saved, thereby reducing system costs, and bringing a great benefit to an operator.

Referring to FIG. 7, FIG. 7 is a flowchart of a decryption method according to an embodiment of the present invention. As shown in FIG. 7, the method includes the following steps.

Step 701: A second OTN transport device receives a value of a high-order counter in an IV and encrypted data that are sent by a first OTN transport device, where the encrypted data is data encrypted by using the IV, a preset key, and the encryption algorithm.

Step 702: Decrypt the encrypted data according to the preset key, the IV, and a decryption algorithm corresponding to the encryption algorithm.

Optionally, the encryption algorithm is a first algorithm, or a first algorithm and a second algorithm. The first algorithm is an AES algorithm, and the second algorithm is an XOR algorithm.

In a counter mode, the second algorithm is the XOR algorithm, the IV is a counter, and the counter may be classified into a high-order counter and a low-order counter. Transport of the IV between the first OTN transport device and the second OTN transport device may be implemented by using a preset overhead.

In other modes, transport of the IV between the first OTN transport device and the second OTN transport device may still be implemented by using a preset overhead.

The embodiment is hereinafter described in detail by using only a counter as an example.

Optionally, the receiving, by a second OTN transport device, a value of a high-order counter in an IV and encrypted data that are sent by a first OTN transport device, where the encrypted data is data encrypted by using the IV, a preset key, and the encryption algorithm includes receiving, by the second OTN transport device, the value of the high-order counter sent by the first OTN transport device by using a preset overhead in an ODU frame or an OTU frame.

The low-order counter is a counter predetermined by an encryption end and a decryption end, and changes all the time, but a counting mechanism may ensure consistency of counters and recoverability of an error.

As shown in FIG. 4, transporting is mainly performed by using an ODUk or OTUk overhead, for example, a PSI reserved overhead, an EXP overhead, or other overheads. A typical application is using a PSI field. A PSI in an ODUk Overhead area carries the IV.

According to architecture of an AES-counter, a same IV vector needs to be provided when a cipher block is calculated during encryption and decryption. In implementation of an ODUk, with respect to a feature of an OTN system, the IV is obtained by counting ODUk data. The IV consists of 2 counters, which are respectively a high-order counter that counts based on an OTN multiframe and a low-order counter based on any Byte data. In a manner of replicating and splicing the counters or other manners, the higher-order and low-order counters are extended into 128-bit information for use by the AES encryption algorithm.

The value of the high-order counter is transported by using the ODUk or OTUk overhead in the OTN system, for example, the PSI reserved overhead, EXP overhead, and other overheads. However, the value of the low-order counter is obtained by calculation by the encryption end and the decryption end respectively according to determined Byte data, and is not transported by using an overhead. This saves an overhead bandwidth, ensures that an IV value is synchronized rapidly, and because of privacy of the IV, also ensures that a complete IV value cannot be restored from an optical fiber even if the optical fiber is monitored, and thereby ensures that the encrypted data cannot be cracked.

The high-order counter can be cleared only after it is full, but the low-order counter may be cleared by using a multiframe header indicator. Therefore, to ensure synchronization of keys between the encryption end and the decryption end, it is necessary to transport the high-order counter from the encryption end to the decryption end, but the low-order counter only needs to be maintained by the encryption end and decryption end respectively. By controlling a bit width of the high-order counter, IV values may not be repeated within a period of time. Before repeated IV values appear, in consideration of system security, it is necessary to update the keys to ensure that cipher blocks are not repeated. In a typical application, for example, the high-order counter is preset to count based on a multiframe, and the low-order counter is preset to count based on 16 Byte and is cleared by a high-order counting pulse. By using this calculation manner, it may be ensured that IV values are not repeated within N hours (N may be 2.7), that is, for an OTUk, a longest interval, that may be supported, of updating a key is 2.7 hours.

When a device at the encryption end is abnormal, a case in which IV vectors at the two ends are inconsistent may occur, and a synchronization mechanism is required to ensure consistency between the IV vector at the decryption end and the IV vector at the encryption end. A manner is transporting the high-order counter in the IV vector by using a reserved overhead. The encryption end transports a currently used high-order counter in the overhead. After receiving a value of the high-order counter, the decryption end compares it with a value of a local high-order counter; if the values are equal, a decryption process is performed normally; if the values are not equal for multiple times, the decryption end enters an out-of-synchronization state. In this case, the decryption end starts to determine whether the value of the high-order counter transported by the encryption end is correct. A determining method includes predetermining a next value of the high-order counter sent by the encryption end; if it is predetermined that the next value is correct, updating the value of the local high-order counter to be the same as that of the encryption end, and thereby obtaining IV values of same composition.

Optionally, in a case in which the second OTN transport device detects that the values of the high-order counter are non-consecutive, the second OTN transport device detects whether the values of the high-order counter sent by the first OTN transport device are consecutive for multiple times, where the multiple times are at least one time; and if yes, the second OTN transport device changes values of a local high-order counter to the values of the high-order counter sent by the first OTN transport device.

The method further includes, if the second OTN transport device detects that the values of the high-order counter sent by the first OTN transport device are not consecutive for multiple times, determining that the first OTN transport device is abnormal.

It is assumed that values at the decryption end are 0 1 2 3 4 5, but values at the sending end are 0 1 2 3 4 5 9. The decryption end considers that 9 is incorrect, because a value of the local high-order counter calculated locally by the second OTN transport device according to a consecutive counting rule should be 6. The decryption end continues to detect values of the high-order counter sent by the encryption end. If the encryption end continues to send 10 11 12 13 14, the decryption end detects that values of the high-order counter sent by the encryption end satisfy a +1 rule for multiple times, and the decryption end may automatically skip to 14. Then local count values of the decryption end become 15 16, and so on.

Optionally, before the decrypting the encrypted data according to the preset key, the IV, and a decryption algorithm corresponding to the encryption algorithm, the method further includes receiving, by the second OTN transport device, a request sent by the first OTN transport device; in a case in which the second OTN determines decryption, sending acknowledgement information of the request to the first OTN transport device; receiving a key switching command sent by the first OTN transport device, where the key switching command carries time information of key switching; and acquiring a decryption key according to the time information of the key switching and a preset key generation algorithm.

The encryption end and the decryption end may predetermine a key generation algorithm, where the key generation algorithm performs calculation by using time information as an input value.

Optionally, before the decrypting the encrypted data according to the preset key, the IV, and a decryption algorithm corresponding to the encryption algorithm, the method further includes receiving, by the second OTN transport device, a request sent by the first OTN transport device; in a case in which the second OTN determines decryption, sending acknowledgement information of the request to the first OTN transport device; receiving a key switching command sent by the first OTN transport device; and acquiring a decryption key according to the key switching command and the preset key.

The encryption end and the decryption end may predetermine that after the key switching command is received, newly stored keys are used as a decryption key and an encryption key to ensure consistency of keys the encryption end and at the decryption end.

Figure 8:
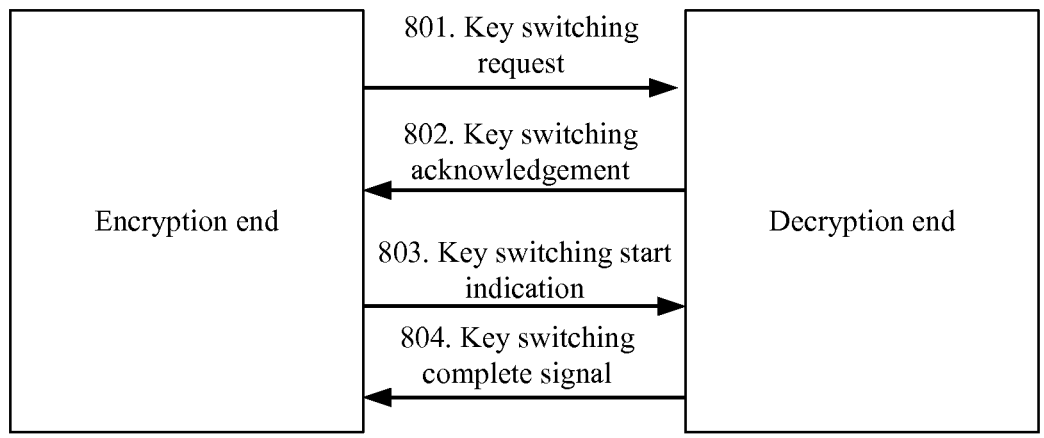
FIG. 8 is a structural diagram of an OTN transport device according to an embodiment of the present invention.

Referring to FIG. 8, FIG. 8 is a schematic diagram of a key switching method at an encryption end and a decryption end according to an embodiment of the present invention. As shown in FIG. 8, the method includes the following steps.

Step 801: The encryption end sends a key switching request to the decryption end.

Step 802: The decryption end sends a key switching acknowledgement to the encryption end.

Step 803: The encryption end sends a key switching start indication to the decryption end.

Step 804: The decryption end sends a key switching complete signal to the encryption end.

As another optional embodiment, the decrypting the encrypted data according to the preset key, the IV, and a decryption algorithm corresponding to the encryption algorithm includes, in a case in which the IV is data received by the first OTN transport device, decrypting, by the second OTN transport device according to the IV, the key, and the first algorithm that are preset, the encrypted data sent by the first OTN transport device.

Optionally, the first algorithm is an AES algorithm, and the second algorithm is an XOR algorithm.

For details, reference may be made to the embodiment described in FIG. 3 and the embodiment described in FIG. 5, and no further description is provided herein.

The embodiment of the present invention provides an encryption and decryption method. In the method, a first OTN transport device encrypts, according to an IV, a key, and an encryption algorithm that are preset, data received by the first OTN transport device, and sends the IV and the encrypted data to a second OTN transport device; and the second OTN transport device receives a value of a high-order counter in the IV and the encrypted data that are sent by the first OTN transport device, where the encrypted data is data encrypted by using the IV, the preset key, and the encryption algorithm, and decrypts the encrypted data according to the preset key, the IV, and a decryption algorithm corresponding to the encryption algorithm. Therefore, an encryption and decryption function is added to an OTN transport device, types of services do not need to be distinguished, and a dedicated encryption device is saved, thereby reducing system costs, and bringing a great benefit to an operator.

Figure 9:
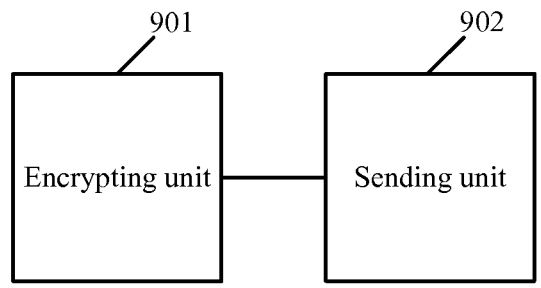
FIG. 9 is a structural diagram of an OTN transport device according to an embodiment of the present invention.

Referring to FIG. 9, FIG. 9 is a structural diagram of an OTN transport device according to an embodiment of the present invention. As shown in FIG. 9, the device includes the following units.

An encrypting unit 901 is configured to encrypt received data according to an IV, a key, and an encryption algorithm that are preset.

For an encryption and decryption algorithm of the present invention, reference may be made to multiple structures such as an ECB, CBC, CFB, OFB, and a CTR.

Optionally, the encryption algorithm is a first algorithm, or a first algorithm and a second algorithm. The first algorithm is an AES algorithm, and the second algorithm is an XOR algorithm. In the multiple structures such as the ECB, CBC, CFB, and OFB, original data may be encrypted by using the AES algorithm or by using a combination of AES encryption and XOR encryption.

The IV is a counter in a CTR structure. As shown in FIG. 3, FIG. 3 is a schematic structural diagram of a CTR in the prior art. An IV Coutner1 is input, and a plaintext 1 is encrypted by using a combination of AES encryption and XOR encryption to acquire a ciphertext 1; at a decryption end, the IV Counter1 is input, and the ciphertext 1 is decrypted by using a combination of an AES decryption algorithm and an XOR decryption algorithm to acquire the plaintext 1. An IV Coutner2 is input, and a plaintext 2 is encrypted by using a combination of AES encryption and XOR encryption to acquire a ciphertext 2; at the decryption end, the IV Counter2 is input, and the ciphertext 2 is decrypted by using a combination of an AES decryption algorithm and an XOR decryption algorithm to acquire the plaintext 2.

A sending unit 902 is configured to send the IV and the data encrypted by the encrypting unit 801 to a second OTN transport device for decryption.

The IV includes the value of the high-order counter and a value of a low-order counter, where the low-order counter is a counter predetermined by the first OTN transport device and the second OTN transport device.

Optionally, the sending unit 902 is configured to send the value of the high-order counter in the IV to the second OTN transport device by using a preset overhead in an ODU frame or an OTU frame; and send the encrypted data to the second OTN transport device by using a payload in the ODU frame or the OTU frame.

For details, reference may be made to the descriptions of FIG. 4 and FIG. 5, and no further description is provided herein.

The sending, by the sending unit, the value of the high-order counter in the IV to the second OTN transport device by using a preset overhead in an ODU frame or an OTU frame includes sending the value of the high-order counter in the IV to the second OTN transport device by using the preset overhead in the ODU frame or the OTU frame, where the IV includes the value of the high-order counter and a value of a low-order counter, where the low-order counter is a counter predetermined by the first OTN transport device and the second OTN transport device.

According to architecture of an AES-counter, a same IV vector needs to be provided when a cipher block is calculated during encryption and decryption. In implementation of an ODUk, with respect to a feature of an OTN system, the IV is obtained by counting ODUk data. The IV consists of 2 counters, which are respectively a high-order counter that counts based on an OTN multiframe and a low-order counter based on determined Byte data. In a manner of replicating and splicing the counters or other manners, values of the higher-order and low-order counters are extended into 128-bit information for use by the AES encryption algorithm. In the OTN system, the value of the high-order counter is transported by using an ODUk or OTUk overhead, for example, a PSI reserved overhead, an EXP overhead, or other overheads. However, the value of the low-order counter is obtained by calculation by an encryption end and an decryption end respectively according to determined Byte data, and is not transported by using an overhead. This saves an overhead bandwidth, ensures that an IV value is synchronized rapidly, and because of privacy of the IV, also ensures that a complete IV value cannot be restored from an optical fiber even if the optical fiber is monitored, and thereby ensures that the encrypted data cannot be cracked.

The high-order counter can be cleared only after it is full, but the low-order counter may be cleared by using a multiframe header indicator. Therefore, to ensure synchronization of keys between the encryption end and the decryption end, it is necessary to transport the high-order counter from the encryption end to the decryption end, but the low-order counter only needs to be maintained by the encryption end and decryption end respectively. By controlling a bit width of the high-order counter, IV values may not be repeated within a period of time. Before repeated IV values appear, in consideration of system security, it is necessary to update the keys to ensure that cipher blocks are not repeated. Like a KEY value, the IV value needs to be updated periodically, or otherwise, it is easily cracked. If the KEY value changes every 2 hours, the IV value changes constantly within 2 hours. In this way, calculated cipher blocks are not repeated. After the 2 hours, the keys are updated, and a new cycle of IV values may be started again. In a typical application, for example, the high-order counter is preset to count based on a multiframe, and the low-order counter is preset to count based on 16 Byte and is cleared by a high-order counting pulse. By using this calculation manner, it may be ensured that IV values are not repeated within N hours (N may be 2.7), that is, for an OTUk, a longest interval, that may be supported, of updating a key is 2.7 hours.

When a device at the encryption end is abnormal, a case in which IV vectors at the two ends are inconsistent may occur, and a synchronization mechanism is required to ensure consistency between the IV vector at the decryption end and the IV vector at the encryption end. A manner is transporting the high-order counter in the IV vector by using an overhead. A preferred overhead is a reserved overhead, where the reserved overhead is an overhead without a clock in the current OTN system. The encryption end transports a currently used high-order counter in the overhead. After receiving a value of the high-order counter, the decryption end compares it with a value of a local high-order counter; if the values are equal, a decryption process is performed normally; if the values are not equal for multiple times, the decryption end enters an out-of-synchronization state. In this case, the decryption end starts to determine whether the value of the high-order counter transported by the encryption end is correct. A determining method includes predetermining a next value of the high-order counter sent by the encryption end; if it is determined that the next value is correct, updating the value of the local high-order counter to be the same as that of the encryption end, and thereby obtaining IV values of same composition. For example, it is assumed that values at the decryption end are 0 1 2 3 4 5, but values at the sending end are 0 1 2 3 4 5 9. The decryption end considers that 9 is incorrect, because a value of the local high-order counter calculated locally by the second OTN transport device according to a consecutive counting rule should be 6. The decryption end continues to detect values of the high-order counter sent by the encryption end. If the encryption end continues to send 10 11 12 13 14, the decryption end detects that values of the high-order counter sent by the encryption end satisfy a +1 rule for multiple times, and the decryption end may automatically skip to 14. Then local count values of the decryption end become 15 16, and so on.

In another optional embodiment, the encrypting unit is configured to encrypt, according to the IV, the key, and the first algorithm that are preset, the data received by the first OTN transport device.

For details, reference may be made to the description of FIG. 6, and no further description is provided herein.

The embodiment of the present invention provides an encryption and decryption device. In the device, a first OTN transport device encrypts, according to an IV, a key, and an encryption algorithm that are preset, data received by the first OTN transport device, and sends the IV and the encrypted data to a second OTN transport device; and the second OTN transport device receives a value of a high-order counter in the IV and the encrypted data that are sent by the first OTN transport device, where the encrypted data is data encrypted by using the IV, the preset key, and the encryption algorithm, and decrypts the encrypted data according to the preset key, the IV, and a decryption algorithm corresponding to the encryption algorithm. Therefore, an encryption and decryption function is added to an OTN transport device, types of services do not need to be distinguished, and a dedicated encryption device is saved, thereby reducing system costs, and bringing a great benefit to an operator.

Figure 10:
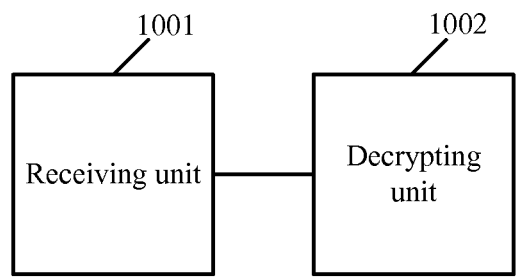
FIG. 10 is a structural diagram of an OTN transport device according to an embodiment of the present invention.

Referring to FIG. 10, FIG. 10 is a structural diagram of an OTN transport device according to an embodiment of the present invention. As shown in FIG. 10, the device includes the following units.

A receiving unit 1001 is configured to receive a value of a high-order counter in an IV and encrypted data that are sent by a first OTN transport device, where the encrypted data is data encrypted by using the IV, a preset key, and the encryption algorithm.

Optionally, the encryption algorithm is a first algorithm, or a first algorithm and a second algorithm. The first algorithm is an AES algorithm, and the second algorithm is an XOR algorithm.

In a counter mode, the second algorithm is the XOR algorithm, the IV is a counter, and the counter may be classified into a high-order counter and a low-order counter. Transport of the IV between the first OTN transport device and the second OTN transport device may be implemented by using a preset overhead.

In other modes, transport of the IV between the first OTN transport device and the second OTN transport device may still be implemented by using a preset overhead.

The embodiment is hereinafter described in detail by using only a counter as an example.

A decrypting unit 1002 is configured to decrypt the encrypted data according to the preset key, the IV received by the receiving unit 1001, and a decryption algorithm corresponding to the encryption algorithm.

Optionally, the receiving unit 1001 is configured to receive the value of the high-order counter sent by the first OTN transport device by using a preset overhead in an ODU frame or an OTU frame.

The low-order counter is a counter determined by an encryption end and a decryption end, and changes all the time, but a counting mechanism may ensure consistency of counters and recoverability of an error.

As shown in FIG. 4, transporting is mainly performed by using an ODUk or OTUk overhead, for example, a PSI reserved overhead, an EXP overhead, or other overheads. A typical application is using a PSI field. A PSI in an ODUk Overhead area carries the IV.

According to architecture of an AES-counter, a same IV vector needs to be provided when a cipher block is calculated during encryption and decryption. In implementation of an ODUk, with respect to a feature of an OTN system, the IV is obtained by counting ODUk data. The IV consists of 2 counters, which are respectively a high-order counter that counts based on an OTN multiframe and a low-order counter based on any Byte data. In a manner of replicating and splicing the counters or other manners, the higher-order and low-order counters are extended into 128-bit information for use by the AES encryption algorithm.

The value of the high-order counter is transported by using the ODUk or OTUk overhead in the OTN system, for example, the PSI reserved overhead, EXP overhead, and other overheads. However, the value of the low-order counter is obtained by calculation by the encryption end and the decryption end respectively according to determined Byte data, and is not transported by using an overhead. This saves an overhead bandwidth, ensures that an IV value is synchronized rapidly, and because of privacy of the IV, also ensures that a complete IV value cannot be restored from an optical fiber even if the optical fiber is monitored, and thereby ensures that the encrypted data cannot be cracked.

The high-order counter can be cleared only after it is full, but the low-order counter may be cleared by using a multiframe header indicator. Therefore, to ensure synchronization of keys between the encryption end and the decryption end, it is necessary to transport the high-order counter from the encryption end to the decryption end, but the low-order counter only needs to be maintained by the encryption end and decryption end respectively. By controlling a bit width of the high-order counter, IV values may not be repeated within a period of time. Before repeated IV values appear, in consideration of system security, it is necessary to update the keys to ensure that cipher blocks are not repeated. In a typical application, for example, the high-order counter is preset to count based on a multiframe, and the low-order counter is preset to count based on 16 Byte and is cleared by a high-order counting pulse. By using this calculation manner, it may be ensured that IV values are not repeated within N hours (N may be 2.7), that is, for an OTUk, a longest interval, that may be supported, of updating a key is 2.7 hours.

When a device at the encryption end is abnormal, a case in which IV vectors at the two ends are inconsistent may occur, and a synchronization mechanism is required to ensure consistency between the IV vector at the decryption end and the IV vector at the encryption end. A manner is transporting the high-order counter in the IV vector by using a reserved overhead. The encryption end transports a currently used high-order counter in the overhead. After receiving a value of the high-order counter, the decryption end compares it with a value of a local high-order counter; if the values are equal, a decryption process is performed normally; if the values are not equal for multiple times, the decryption end enters an out-of-synchronization state. In this case, the decryption end starts to determine whether the value of the high-order counter transported by the encryption end is correct. A determining method is: predetermining a next value of the high-order counter sent by the encryption end; if it is determined that the next value is correct, updating the value of the local high-order counter to be the same as that of the encryption end, and thereby obtaining IV values of same composition.

Optionally, the device further includes a changing unit, where the changing unit is configured to, in a case in which it is detected that the values of the high-order counter are non-consecutive, detect whether the values of the high-order counter sent by the first OTN transport device are consecutive for multiple times, where the multiple times are at least one time; and if yes, change values of a local high-order counter to the values of the high-order counter sent by the first OTN transport device.

Optionally, the device further includes a determining unit, where the determining unit is configured to, if it is detected that the values of the high-order counter sent by the first OTN transport device are not consecutive for multiple times, determine that the first OTN transport device is abnormal.

It is assumed that values at the decryption end are 0 1 2 3 4 5, but values at the sending end are 0 1 2 3 4 5 9. The decryption end considers that 9 is incorrect, because a value of the local high-order counter calculated locally by the second OTN transport device according to a consecutive counting rule should be 6. The decryption end continues to detect values of the high-order counter sent by the encryption end. If the encryption end continues to send 10 11 12 13 14, the decryption end detects that values of the high-order counter sent by the encryption end satisfy a +1 rule for multiple times, and the decryption end may automatically skip to 14. Then local count values of the decryption end become 15 16, and so on.

Optionally, the device further includes a key switching unit, where the key switching unit is configured to receive a request sent by the first OTN transport device; in a case in which decryption is determined, send acknowledgement information of the request to the first OTN transport device; receive a key switching command sent by the first OTN transport device, where the key switching command carries time information of key switching; and acquire a decryption key according to the time information of the key switching and a preset key generation algorithm.

The encryption end and the decryption end may predetermine a key generation algorithm, where the key generation algorithm performs calculation by using time information as an input value.

Optionally, the device further includes a key switching unit, where the key switching unit is configured to receive a request sent by the first OTN transport device; in a case in which decryption is determined, send acknowledgement information of the request to the first OTN transport device; receive a key switching command sent by the first OTN transport device; and acquire a decryption key according to the key switching command and the preset key.

The encryption end and the decryption end may predetermine that after the key switching command is received, newly stored keys are used as a decryption key and an encryption key to ensure consistency of keys at the encryption end and the decryption end.

For details, reference may be made to the description of FIG. 7, and no further description is provided herein.

In another embodiment, the decrypting unit 1002 is configured to, in a case in which the IV is data received by the first OTN transport device, decrypt, according to the IV, the key, and the first algorithm that are preset, the encrypted data sent by the first OTN transport device.

For details, reference may be made to the embodiment described in FIG. 3 and the embodiment described in FIG. 5, and no further description is provided herein.

The embodiment of the present invention provides an encryption and decryption device. In the device, a first OTN transport device encrypts, according to an IV, a key, and an encryption algorithm that are preset, data received by the first OTN transport device, and sends the IV and the encrypted data to a second OTN transport device; and the second OTN transport device receives a value of a high-order counter in the IV and the encrypted data that are sent by the first OTN transport device, where the encrypted data is data encrypted by using the IV, the preset key, and the encryption algorithm, and decrypts the encrypted data according to the preset key, the IV, and a decryption algorithm corresponding to the encryption algorithm. Therefore, an encryption and decryption function is added to an OTN transport device, types of services do not need to be distinguished, and a dedicated encryption device is saved, thereby reducing system costs, and bringing a great benefit to an operator.

Figure 11:
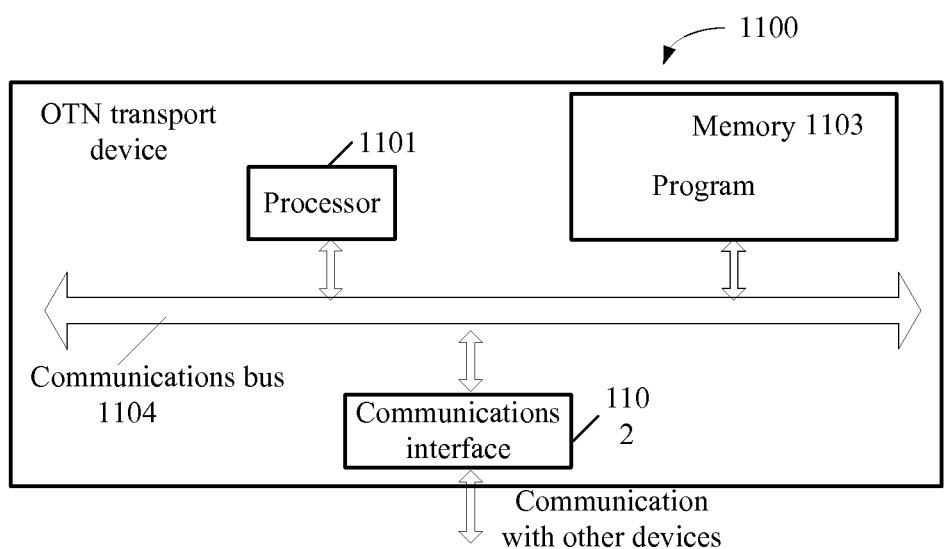
FIG. 11 is a structural diagram of an OTN transport device according to an embodiment of the present invention.

FIG. 11 is a structural diagram of an OTN transport device according to an embodiment of the present invention. Referring to FIG. 11, FIG. 11 shows an OTN transport device 1100 according to an embodiment of the present invention. The specific embodiment of the present invention does not limit specific implementation of the OTN transport device. The OTN transport device 1100 includes a processor 1101, a communications interface 1102, a memory 1103, and a bus 1104.

The processor 1101, communications interface 1102, and memory 1103 implement communication between each other by using the bus 1104.

The communications interface 1102 is configured to perform communication with other devices.

The processor 1101 is configured to execute a program.

The program may include program code, where the program code includes a computer operation instruction.

The processor 1101 may be a central processing unit (CPU), or an application specific integrated circuit (ASIC), or is configured as one or more integrated circuits for implementing the embodiment of the present invention.

The memory 1103 is configured to store the program. The memory 1103 may be a volatile memory, for example, a random access memory (RAM), or a non-volatile memory, for example, a read-only memory (ROM), a flash memory, a hard disk drive (HDD), or a solid-state hard disk drive (SSD). The processor 1101 executes the following method according to the program instruction stored by the memory 1103. The method includes encrypting, by a first OTN transport device according to an IV, a key, and an encryption algorithm that are preset, data received by the first OTN transport device; and sending a value of a high-order counter in the IV and the encrypted data to a second OTN transport device for decryption; where the IV includes the value of the high-order counter and a value of a low-order counter, where the low-order counter is a counter predetermined by the first OTN transport device and the second OTN transport device.

The sending a value of a high-order counter in the IV and the encrypted data to a second OTN transport device for decryption includes sending the value of the high-order counter in the IV to the second OTN transport device by using a preset overhead in an ODU frame or an OTU frame; and sending the encrypted data to the second OTN transport device by using a payload in the ODU frame or the OTU frame.

The sending the value of the high-order counter in the IV to the second OTN transport device by using a preset overhead in an ODU frame or an OTU frame includes sending the value of the high-order counter in the IV to the second OTN transport device by using the preset overhead in the ODU frame or the OTU frame.

The encrypting, by a first OTN transport device according to an IV, a key, and an encryption algorithm that are preset, data received by the first OTN transport device includes, in a case in which the IV is data received by the first OTN transport device, encrypting, by the first OTN transport device according to the IV, the key, and the first algorithm that are preset, the data received by the first OTN transport device.

The encryption algorithm is a first algorithm, or a first algorithm and a second algorithm.

The first algorithm is an AES algorithm, and the second algorithm is an XOR algorithm.

Further, the following method is executed. The method includes receiving, by a second OTN transport device, a value of a high-order counter in an IV and encrypted data that are sent by a first OTN transport device, where the encrypted data is data encrypted by using the IV, a preset key, and the encryption algorithm; and decrypting the encrypted data according to the preset key, the IV, and a decryption algorithm corresponding to the encryption algorithm; where the IV includes the value of the high-order counter and a value of a low-order counter, where the low-order counter is a counter predetermined by the first OTN transport device and the second OTN transport device.

The receiving, by a second OTN transport device, a value of a high-order counter in an IV and encrypted data that are sent by a first OTN transport device, where the encrypted data is data encrypted by using the IV, a preset key, and the encryption algorithm includes receiving, by the second OTN transport device, the value of the high-order counter sent by the first OTN transport device by using a preset overhead in an ODU frame or an OTU frame.

The processor 1101 may also execute the following method according to the program instruction stored by the memory 1103. The method includes, in a case in which the second OTN transport device detects that the values of the high-order counter are non-consecutive, detecting, by the second OTN transport device, whether the values of the high-order counter sent by the first OTN transport device are consecutive for multiple times, where the multiple times are at least one time; and if yes, changing, by the second OTN transport device, values of a local high-order counter to the values of the high-order counter sent by the first OTN transport device.

The processor 1101 may also execute the following method according to the program instruction stored by the memory 1103. The method includes, if the second OTN transport device detects that the values of the high-order counter sent by the first OTN transport device are not consecutive for multiple times, determining that the first OTN transport device is abnormal.

Before the decrypting the encrypted data according to the preset key, the IV, and a decryption algorithm corresponding to the encryption algorithm, the method further includes receiving, by the second OTN transport device, a request sent by the first OTN transport device; in a case in which the second OTN determines decryption, sending acknowledgement information of the request to the first OTN transport device; receiving a key switching command sent by the first OTN transport device, where the key switching command carries time information of key switching; and acquiring a decryption key according to the time information of the key switching and a preset key generation algorithm.

The processor 1101 may also execute the following method according to the program instruction stored by the memory 1103. The method includes receiving, by the second OTN transport device, a request sent by the first OTN transport device; in a case in which the second OTN determines decryption, sending acknowledgement information of the request to the first OTN transport device; receiving a key switching command sent by the first OTN transport device; and acquiring a decryption key according to the key switching command and the preset key.

The decrypting the encrypted data according to the preset key, the IV, and a decryption algorithm corresponding to the encryption algorithm, includes, in a case in which the IV is data received by the first OTN transport device, decrypting, by the second OTN transport device according to the IV, the key, and the first algorithm that are preset, the encrypted data sent by the first OTN transport device.

The encryption algorithm is a first algorithm, or a first algorithm and a second algorithm.

The first algorithm is an AES algorithm, and the second algorithm is an XOR algorithm.

The embodiment of the present invention provides an encryption and decryption device. In the device, a first OTN transport device encrypts, according to an IV, a key, and an encryption algorithm that are preset, data received by the first OTN transport device, and sends the IV and the encrypted data to a second OTN transport device; and the second OTN transport device receives a value of a high-order counter in the IV and the encrypted data that are sent by the first OTN transport device, where the encrypted data is data encrypted by using the IV, the preset key, and the encryption algorithm, and decrypts the encrypted data according to the preset key, the IV, and a decryption algorithm corresponding to the encryption algorithm. Therefore, an encryption and decryption function is added to an OTN transport device, types of services do not need to be distinguished, and a dedicated encryption device is saved, thereby reducing system costs, and bringing a great benefit to an operator.

The foregoing descriptions are merely exemplary implementation manners of the present invention, but are not intended to limit the protection scope of the present invention.

Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A decryption method, comprising:
receiving, by a second optical transport network (OTN) transport device, a value of a high-order counter in an initial vector (IV) and encrypted data that are sent by a first OTN transport device, wherein the encrypted data is data encrypted by using the IV, a preset key, and an encryption algorithm; and
decrypting the encrypted data according to the preset key, the IV, and a decryption algorithm corresponding to the encryption algorithm, wherein the IV comprises the value of the high-order counter and a value of a low-order counter, and wherein the low-order counter is a counter predetermined by the first OTN transport device and the second OTN transport device,
wherein receiving, by the second OTN transport device, the value of the high-order counter in the IV and the encrypted data that are sent by the first OTN transport device, wherein the encrypted data is the data encrypted by using the IV, the preset key, and the encryption algorithm comprises receiving, by the second OTN transport device, the value of the high-order counter sent by the first OTN transport device by using a preset overhead in an optical channel data unit (ODU) frame or an optical channel transport unit (OTU) frame, and
wherein before decrypting the encrypted data according to the preset key, the IV, and the decryption algorithm corresponding to the encryption algorithm, the method further comprises:
detecting whether the values of the high-order counter sent by the first OTN transport device are consecutive for multiple times when the second OTN transport device detects that the values of the high-order counter are non-consecutive, wherein the multiple times are at least one time; and changing, by the second OTN transport device, values of a local high-order counter to the values of the high-order counter sent by the first OTN transport device when the values of the high-order counter sent by the first OTN transport device are consecutive for multiple times.

2. The method according to claim 1, wherein the method further comprises determining that the first OTN transport device is abnormal when the second OTN transport device detects that the values of the high-order counter sent by the first OTN transport device are not consecutive for multiple times.

3. A decryption method, comprising:
receiving, by a second optical transport network (OTN) transport device, a value of a high-order counter in an initial vector (IV) and encrypted data that are sent by a first OTN transport device, wherein the encrypted data is data encrypted by using a preset key, and an encryption algorithm; and
decrypting the encrypted data according to the preset key, the IV, and a decryption algorithm corresponding to the encryption algorithm, wherein the IV comprises the value of the high-order counter and a value of a low-order counter, and wherein the low-order counter is a counter predetermined by the first OTN transport device and the second OTN transport device, and
wherein before decrypting the encrypted data according to the preset key, the IV, and the decryption algorithm corresponding to the encryption algorithm, the method further comprises:
  receiving, by the second OTN transport device, a request sent by the first OTN transport device;
  sending acknowledgement information of the request to the first OTN transport device when the second OTN determines decryption;
  receiving a key switching command sent by the first OTN transport device, wherein the key switching command carries time information of key switching; and
  acquiring a decryption key according to the time information of the key switching and a preset key generation algorithm.

4. A decryption method, comprising:
receiving, by a second optical transport network (OTN) transport device, a value of a high-order counter in an initial vector (IV) and encrypted data that are sent by a first OTN transport device, wherein the encrypted data is data encrypted by using the IV, a preset key, and an encryption algorithm; and
decrypting the encrypted data according to the preset key, the IV, and a decryption algorithm corresponding to the encryption algorithm, wherein the IV comprises the value of the high-order counter d a value of a low-order counter, and wherein the low-order counter is a counter predetermined by the first OTN transport device and the second OTN transport device, and
wherein before decrypting the encrypted data according to the preset key, the IV, and the decryption algorithm corresponding to the encryption algorithm, the method further comprises:
  receiving, by the second OTN transport device, a request sent by the first OTN transport device;
  sending acknowledgement information of the request to the first OTN transport device when the second OTN determines decryption;
  receiving a key switching command sent by the first OTN transport device; and
  acquiring a decryption key according to the key switching command and the preset key.

5. The method according to claim 4, wherein decrypting the encrypted data according to the preset key, the IV, and the decryption algorithm corresponding to the encryption algorithm comprises decrypting, by the second OTN transport device according to the IV, the key, and the first algorithm that are preset, the encrypted data sent by the first OTN transport device, wherein the encryption algorithm is a first algorithm, or a first algorithm and a second algorithm.

6. The method according o claim 5, wherein the first algorithm is an advanced encryption standard (AES) algorithm, and wherein the second algorithm is an exclusive OR (XOR) algorithm.

7. An optical transport network (OTN) transport device, comprising:
a receiver configured to receive a value of a high-order counter in an initial vector (IV) and encrypted data that are sent by a first OTN transport device, wherein the encrypted data is data encrypted by using the IV, a preset key, and the encryption algorithm; and
a computer processor configured to decrypt the encrypted data according to the preset key, the IV received by the receiver, and a decryption algorithm corresponding to the encryption algorithm,
wherein the IV comprises the value of the high-order counter and a value of a low-order counter,
wherein the low-order counter is a counter predetermined by the first OTN transport device and the second OTN transport device,
wherein the receiver is configured to receive the value of the high-order counter sent by the first OTN transport device by using a preset overhead in an optical channel data unit (ODU) frame or an optical channel transport unit (OTU) frame, and
wherein the computer processor is configured to:
  detect whether the values of the high-order counter sent by the first OTN transport device are consecutive for multiple times when the second OTN transport device detects that the values of the high-order counter are non-consecutive, wherein the multiple times are at least at e time; and
  change values of a local high-order counter to the values of the high-order counter sent by the first OTN transport device when the values of the high-order counter sent by the first OTN transport device are consecutive for multiple times.

8. The method according to claim 7, wherein the device further comprises a determining unit, and wherein the determining unit is configured to determine that the first OTN transport device is abnormal when it is detected that the values of the high-order counter sent by the first OTN transport device are not consecutive for multiple times.

9. An optical transport network (OTN) transport device, comprising:
a receiver configured to receive a value of a high-order counter in an initial vector (IV) and encrypted data that are sent by a first OTN transport device, wherein the encrypted data is data encrypted by using the IV, a preset key, and the encryption algorithm; and a computer processor configured to decrypt the encrypted data according to the preset key, the IV received by the receiver, and a decryption algorithm corresponding to the encryption algorithm, wherein the IV comprises the value of the high-order counter and a value of a low-order counter, wherein the low-order counter is a counter predetermined by the first OTN transport device and the second OTN transport device, and wherein the computer processor is configured to:
  receive a request sent by the first OTN transport device;
  send acknowledgement information of the request to the first OTN transport device when decryption is determined;
  receive a key switching command sent by the first OTN transport device, wherein the key switching command carries time information of key switching; and
  acquire a decryption key according to the time information of the key switching and a preset key generation algorithm.

10. An optical transport network (OTN) transport device, comprising:
  a receiver configured to receive a value of a high-order counter in an initial vector (IV) and encrypted data that are sent by a first OTN transport device, wherein the encrypted data is data encrypted using the IV, a preset key, and the encryption algorithm; and
  a computer processor configured to decrypt the encrypted data according to the preset key, the IV received by the receiver, and a decryption algorithm corresponding to the encryption algorithm, wherein the IV comprises the value of the high-order counter and a value of a low-order counter, wherein the low-order counter is a counter predetermined by the first OTN transport device and the second OTN transport device, and wherein the computer processor is configured to:
  receive a request sent by the first OTN transport device;
  send acknowledgement information of the request to the first OTN transport device when decryption is determined;
  receive a key switching command sent by the first OTN transport device; and
  acquire a decryption key according to the key switching command and the preset key.

11. The device according to claim 10, wherein the computer processor is configured to decrypt, according to the IV, the key, and the first algorithm that are preset, the encrypted data sent by the first OTN transport device, and wherein the encryption algorithm is a first algorithm, or a first algorithm and a second algorithm.

12. The device according to claim 11, wherein the first algorithm is an advanced encryption standard (AES) algorithm, and Wherein the second algorithm is an exclusive OR (XOR) algorithm.

* * * * *

UNITED STATES PATENT AND TRADEMARK OFFICE
CERTIFICATE OF CORRECTION

| | | |
|---|---|---|
| PATENT NO. | : 9,509,414 B2 | |
| APPLICATION NO. | : 14/606255 | |
| DATED | : November 29, 2016 | |
| INVENTOR(S) | : Zhaoming Gong and Haobo Wang | |

It is certified that error appears in the above-identified patent and that said Letters Patent is hereby corrected as shown below:

Page 2, References Cited, Other Publications section should read:

LE, D., "Research on AES encryption component base on CRT operation mode," J. Changchun Inst. Tech., Vol. 13, No. 4, 2012, 3 pages.

Column 22, Line 17, Claim 6 should read:

The method according to claim 5, wherein the first algorithm is an advanced encryption standard (AES) algorithm, and wherein the second algorithm is an exclusive OR (XOR) algorithm.

Column 22, Line 49, Claim 7 should read:

An optical transport network (OTN) transport device, comprising:
    a receiver configured to receive a value of a high-order counter in an initial vector (IV) and encrypted data that are sent by a first OTN transport device, wherein the encrypted data is data encrypted by using the IV, a preset key, and the encryption algorithm; and
    a computer processor configured to decrypt the encrypted data according to the preset key, the IV received by the receiver, and a decryption algorithm corresponding to the encryption algorithm,
    wherein the IV comprises the value of the high-order counter and a value of a low-order counter,
    wherein the low-order counter is a counter predetermined by the first OTN transport device and the second OTN transport device,
    wherein the receiver is configured to receive the value of the high-order counter sent by the first OTN transport device by using a preset overhead in an optical channel data unit (ODU) frame or an optical channel transport unit (OTU) frame, and
    wherein the computer processor is configured to:
    detect whether the values of the high-order counter sent by the first OTN transport device are consecutive for multiple times when the second OTN transport device detects that the values of the high-order counter are non-consecutive, wherein the multiple times are at least one time; and Signed and Sealed this
Twenty-first Day of February, 2017

Michelle K. Lee
*Director of the United States Patent and Trademark Office* change values of a local high-order counter to the values of the high-order counter sent by the first OTN transport device when the values of the high-order counter sent by the first OTN transport device are consecutive for multiple times.

Column 24, Line 26, Claim 12 should read:

The device according to claim 11, wherein the first algorithm is an advanced encryption standard (AES) algorithm, and wherein the second algorithm is an exclusive OR (XOR) algorithm.